United States Patent [19]

Go

[11] 4,110,315

[45] Aug. 29, 1978

[54] MOLDED CONTAINER OF POLYESTER PREPARED FROM A BIS(HYDROXYETHOXYPHENYL)SULFONE

[75] Inventor: Santos W. Go, Toledo, Ohio

[73] Assignee: Owens-Illinois, Inc., Toledo, Ohio

[21] Appl. No.: 812,921

[22] Filed: Jul. 5, 1977

Related U.S. Application Data

[63] Continuation-in-part of Ser. No. 690,483, May 27, 1976, abandoned.

[51] Int. Cl.² .................. C08G 63/66; C08G 63/68
[52] U.S. Cl. ................................ 528/294; 206/528; 426/106
[58] Field of Search ..................... 260/49, 47 C

[56] References Cited

U.S. PATENT DOCUMENTS

| | | | |
|---|---|---|---|
| 2,593,411 | 4/1952 | Caldwell | 260/75 |
| 2,973,339 | 2/1961 | Muenster et al. | 260/47 |
| 3,536,665 | 10/1970 | Pietrusza et al. | 260/49 |
| 3,787,526 | 1/1974 | Burns et al. | 260/860 |
| 3,972,852 | 8/1976 | Inata et al. | 260/47 C |

*Primary Examiner*—Lester L. Lee
*Attorney, Agent, or Firm*—Charles S. Lynch; E. J. Holler

[57] ABSTRACT

Improvements in methods for protecting comestibles, e.g., foodstuffs, medicines, and other like related substances are provided wherein these substances are enveloped in packages, preferably a molded container, which is formed from a linear copolyester consisting essentially of the reaction product of isophthalic acid, optionally, terephthalic acid, and bis(4-beta-hydroxyethoxyphenyl)sulfone, and ethylene glycol. The amount of isophthalic acid, and when employed terephthalic acid, will be in the range of from about 15 to 100 mole percent of isophthalic acid and from about 85 to zero mole percent of terephthalic acid.

8 Claims, No Drawings

MOLDED CONTAINER OF POLYESTER PREPARED FROM A BIS(HYDROXYETHOXYPHENYL)SULFONE

The present application is related to application U.S. Ser. No. 812,922, and it is a continuation-in-part of application Ser. No. 690,483, filed May 27, 1976 and now abandoned.

The present application is directed to packages and methods for protecting comestibles; more specifically, it is directed to molded containers which are formed from linear copolyesters.

Presently there is a strong interest in the packaging industry for protecting comestibles like foodstuffs, medicines, and especially carbonated beverages, or other related substances, by enveloping the substances in packages, for example molded containers, which are formed from various polymers. One polymer in which there is an especially strong interest is poly(ethylene terephthalate) and containers formed from this material, which are biaxially oriented, possess many desirable characteristics. Molded biaxially oriented containers which are formed from poly(ethylene terephthalate) and certain copolyesters are disclosed in U.S. Pat. No. 3,733,309. While molded containers formed from poly(ethylene terephthalate) have, as indicated, may desirable characteristics, there is a need in the art to provide an improved polyester composition which will have oxygen and carbon dioxide permeabilities which are lower than that of poly(ethylene terephthalate) and which will have glass transition temperatures higher than that of poly(ethylene terephthalate). Packages formed from such a polyester are much more versatile in their utilization and, for example, allow the containers to be used to package substances for which the poly(ethylene terephthalate) may not be suitable and also allow such packages to be subjected to environments, for example higher temperatures, to which poly(ethylene terephthalate) may not suitably be subjected, such as in hot filling of foodstuffs in bottles molded from polymers used in the present invention.

U.S. Pat. No. 2,593,411 suggests that polyesters may be formed from dicarboxylic acids and from bis(4-beta-hydroxyalkoxyphenyl) sulfones and that mixed polyesters can likewise be obtained by employing such sulfones in combination with other dihydric and polyhydric alcohols. British patent specification No. 678,264 suggests linear polyesters formed from an aromatic dicarboxylic acid and a glycol, e.g. bis(4-beta-hydroxyethoxyphenyl) sulfone. Also in this regard, reference may be had to British patent specification No. 1,196,911 which discloses the reaction of ethylene glycol with, for example, bis(4-chlorophenyl) sulfone and indicates that such materials may be employed in forming polyesters. Vol. 83 of *Chemical Abstracts*, No. 206808s (1975) discloses polyesters being formed from 4,4'-biphenyldicarboxylic acid and aliphatic glycols and bis(4-beta-hydroxyethoxyphenyl) sulfone. Similarly Vol. 83 *Chemical Abstracts* Nos. 165136a and 165644q (1975) disclose the use of such hydroxyethoxyphenyl sulfones with naphthalene dicarboxylic acids to form polyesters. None of the foregoing are directed to forming polyesters having oxygen permeabilities and $CO_2$ permeabilities which are lower than that of poly-(ethylene terephthalate) and which have glass transition temperatures higher than that of poly(ethylene terephthalate).

Japanese unexamined (Kokai) Patent Publication No. Showa 50-51595 (Patent Appl. No. Showa 48-101837) discloses transparent, dimensionally stable, linear polyesters having high glass transition points but has no recognition, or teachings, with regard to oxygen permeability, or carbon dioxide permeability. It is taught therein to employ for example bis(4-beta-hydroxyethoxyphenyl) sulfone with a diol and a dicarboxylic acid which is primarily terephthalic acid. In order to obtain polyesters suitable for the purposes of this patent application it is taught that, of the dicarboxylic acid used for forming the polyester, over 70 mole percent and preferably over 80% should be terephthalic acid and, based on the acid employed, at least 60%, and preferably 65-95%, should be the described sulfone. A wide variety of optional dicarboxylic acids are set forth from which it is possible to select isophthalic acid. Similarly a wide variety of diols are disclosed, including ethylene glycol.

In accordance with this invention applicant has satisfied the need in the art by providing for improved packaging methods and improved packages, such as a molded container whether it be oriented or unoriented, which packages are formed from polyesters having a lower carbon dioxide and lower oxygen permeability than poly(ethylene terephthalate) and a higher glass transition temperature than poly(ethylene terephthalate).

Thus in accordance with the present invention an improved molded container is provided which is formed from a prescribed linear copolyester. In accordance with another feature of this invention, an improved package is provided which comprises comestibles like foodstuffs, medicines, and other related substances, enveloped in a molded container which molded container comprises a prescribed linear copolyester. In accordance with another feature of this invention an improved method for protecting such comestibles is provided which comprises enveloping such substances in packages which are formed from materials which comprise prescribed linear copolyesters.

The linear copolyesters, which form clear packages contemplated for use herein for packaging comestibles, are the polymeric reaction product of polyester forming reactants consisting essentially of (A) isophthalic acid and, optionally, terephthalic acid, and (B) bis(4-beta-hydroxyethoxyphenyl) sulfone and ethylene glycol, the amount of the (A) reactants, on a mole basis of feed stock, being from about 15 to 100 mole percent of isophthalic acid and about 85 to zero mole percent of terephthalic acid, the amount of bis(4-beta-hydroxyethoxyphenyl) sulfone being from at least 15, usually 20, mole percent up to about 90 mole percent of the combined amount of the (A) reactants employed; and the combined amounts of the (B) reactants being about 110 to about 300 mole percent of the combined amount of the (A) reactants charged. Most suitably the bis(4-beta-hydroxyethoxyphenyl) sulfone will be employed as a reactant in an amount of between about 80 mole percent and about 90 mole percent based on the combined amount of (A) reactants employed, i.e., isophthalic acid and, when employed, terephthalic acid. Excellent linear copolyesters are formed for example using about 85 mole percent of the bis(4-beta-hydroxyethoxyphenyl) sulfone. Most desirably the (A) reactants are employed in molar amounts of about 40 mole percent to about 100 mole percent, usually 50 mole percent or higher, of isophthalic acid and from about 60% to zero mole percent, usually 50 mole percent or lower, of terephthalic acid. Linear copolyesters having an outstanding balance of properties are formed by employing between about 60 to 100 mole percent of isophthalic acid and about 40 to zero mole percent of terephthalic acid based on the (A) reactants. When reference is made herein to carbon dioxide and oxygen permeability of poly(ethylene terephthalate) reference is made to an unoriented pressed film of that material and the oxygen permeability thereof is about 9 cc.mil/100 in$^2$.day.atm. and the carbon dioxide permeability is about 62 cc.mil/100 in$^2$.day.atm., and polymers used in the present invention have $O_2$ permeabilities of less than 8 cc.mil/100 in$^2$.day.atm. and $CO_2$ permeabilities of less than 58 cc.mil/100 in$^2$.day.atm. when measured on unoriented pressed films. In my copending application Ser. No. 643,282 and Ser. No. 643,283 reference is made to a carbon dioxide permeability of around 48 or 50. That figure is based on an extruded poly(ethylene terephthalate) film and, as will be readily apparent, extrusion effects some orientation which in turn, has the effect of reducing the permeability. Thus the above figures contemplate, as indicated, a pressed film which is substantially unoriented. Generally the glass transition temperature of unoriented poly(ethylene terephthalate) is considered to be about 72° C., and the glass transition temperature of polymers used in the present invention is over 75° C.

The polymers used to make the containers of the invention are of sufficiently high molecular weight to make the molded containers and packages, such as by compression molding or blow molding; those used for blow molded containers are high polymers and have an inherent viscosity of over 0.55, and all have inherent viscosities of over 0.4, measured at 25° C., using a solution of 0.25 gms. of polymer dissolved in 100 milliliters of a mixture of 3 weight parts phenol with 2 weight parts 1,1,2,2 tetrachloroethane. All inherent viscosities reported herein were measured under such conditions.

When reference is made herein to the bis(4-beta-hydroxyethoxyphenyl) sulfone and to ethylene glycol it is contemplated that this likewise includes esters thereof as being employed for the reactants. Similarly when reference is made to isophthalic acid and/or terephthalic acid, that terminology contemplates not only the acid as the reactant but also the corresponding acid halides and esters, particularly the lower alkyl ($C_1$ to $C_4$) esters of such acids. Preferably in practicing the invention the ethylene glycol and bis(4-beta-hydroxyethoxyphenyl) sulfone will be used as the glycol per se whereas the diesters of isophthalic acid and, when employed, terephthalic acid will be used as the preferred (A) reactants. These esters may be the aliphatic esters or aromatic esters with the preferred esters being the alkyl esters having from about 1 to 4 carbon atoms with methyl being especially highly preferred. The phenyl esters are the preferred aromatic esters.

The polyesters, as contemplated herein, are synthesized by methods generally known in the art for producting polyesters. The reactants may all be reacted in a single operation by first charging them to an appropriate reactor or a sequential operation may be employed by first reacting the isophthalic acid and ethylene glycol to form bis(beta-hydroxyethyl) isophthalate and then in turn reacting the latter with the remaining ingredients. Since, as indicated, in the preferred practice the diesters of isophthalic acid and terephthalic acid will be employed conventional transesterification followed by polycondensation is contemplated as the preferred approach. Temperatures employed which will be quite suitable for forming the polyesters will generally range between about 200° or 210° C. up to about 295° C., or so, with the preferred ranges being between about 225° C. to about 285° C. Of course the reaction will be done under an inert atmosphere.

Conventional catalysts are likewise employed; for example transesterification is effected in the presence of effective catalytic amounts of transition metal compounds, alkaline earth metal compounds, or alkali metal compounds, for example the acetates, oxides, phenoxides, and alkoxides. Specific suitable catalysts will be for example zinc acetate, manganese acetate, magnesium acetate, calcium acetate, and titanium alkoxides, like titanium tetrabutoxides. Suitable polycondensation catalysts include for example antimony acetate, antimony trioxide, titanium alkoxide, titanyl acetylacetonate, and organotinoxides, for example stannous alkoxides. Usually the catalysts will be present in an amount of about $10^{-5}$ to about $10^{-3}$ moles of catalysts per mole of total acid employed.

Of course suitable adjuvants, such as antioxidants and stabilizers may be employed and they may be added directly to the reaction mass or added to the final polymer.

The linear copolyesters contemplated may be formed into packages of the invention, for example compression or blow molded containers, and preferably biaxially oriented blow molded containers using high polymers having an inherent viscosity of at least 0.55, using conventional plastic forming techniques such as, for example, that disclosed in U.S. Pat. No. 3,733,309. These packages of the invention are ideally suited for protecting comestibles, like foodstuffs e.g. carbonated soft drinks, or medicines, or other related substances, by simply enveloping those substances in these packages.

While the foregoing describes the present invention with sufficient particularity to enable those skilled in the art to make and use same there nonetheless follows, for exemplary purposes only, several examples.

EXAMPLE 1

A linear polyester was prepared having the following units in its backbone:

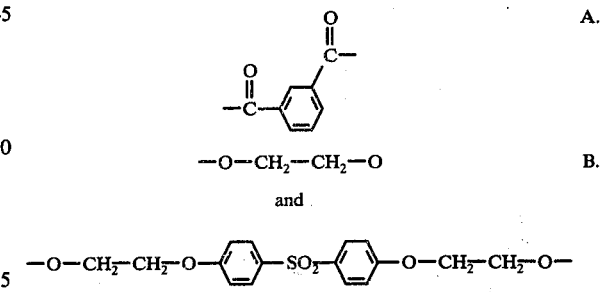

The specific reactant materials employed were about 0.1 mole of dimethyl isophthalate (DMI), about 0.2 mole of ethylene glycol (EG), and about 0.085 mole of bis(4-beta-hydroxyethoxyphenyl) sulfone (BSE). Additionally, about $6.5 \times 10^{-5}$ moles of $Sb_2O_3$ and about $5 \times 10^{-5}$ mole of $Mn(C_2H_3O_2)_2 \cdot 4H_2O$ were employed for catalytic purposes.

The mixture of the reactants along with the catalysts were weighed into a 300 ml three-necked round bottom flask equipped with a stirrer, nitrogen inlet tube, and a condenser. The contents of the flask were heated to and held at about 225° C. for about 3 hrs. with nitrogen flowing into the reaction flask to provide a nitrogen blanket and with methanol being removed. The reactant system was then heated to about 265° C. and held there for about 45 minutes during which time additional methanol was removed. A vacuum of about 0.2 to about 0.45 mm Hg was then applied and the reactant heated to between about 275° C. to about 285° C. with ethylene glycol being removed. The system was held at that latter temperature under that vacuum for approximately 6 hours after which time the polymer was removed. Table A sets forth the glass transition temperature of the polymer and as well as the carbon dioxide and oxygen permeability of films which were pressed from that polymer. In Table A the percentages are based on feed stock.

The polymer had an inherent viscosity of 0.43. When the polymerization is repeated for an extended time using the catalyst system of Example 8, the high polymer produced has an inherent viscosity of more than 0.55.

EXAMPLE 2

Into a 300 ml 3-necked round bottom flask, equipped with a nitrogen gas inlet tube, stirrer and a condenser, the following compounds were added:
11.65 g dimethyl isophthalate
7.77 g dimethyl terephthalate
28.76 g ethoxylated 4,4' sulfonyl diphenol
12.4 g ethylene glycol
12.25 mg manganous acetate
14.58 mg antimony trioxide The content of the flask was heated at 225° C. under nitrogen atmosphere for 3 hours and 15 minutes. During this time, methanol was distilled off. The reaction temperature was then raised to 275° C. After 1 hour and 25 minutes at 275° C., the nitrogen flow was stopped and the reaction was continued under vacuum of less than 0.5 mm Hg at 280°–285° C. After 6½ hours, the reaction was stopped. The inherent viscosity of the copolyester was 0.50. When the polymerization is repeated using the catalyst system of Example 8 (zinc acetate dihydrate and titanyl acetylacetonate) the high polymer produced has an inherent viscosity of over 0.55.

In Table A, $O_2$ and $CO_2$ respectively refer to the oxygen permeability and carbon dioxide permeability of pressed films as measured by ASTM D-1434-66 at about 73° F. and 50% relative humidity in cc.mil/100 in$^2$.day.atm. and Tg represents the glass transition temperature as measured with a Differential Scanning Calorimeter.

EXAMPLE 3

Into a 300 ml 3-necked round bottom flask, equipped with a nitrogen gas inlet tube, stirrer and a condenser, the following compounds were added:
9.71 g dimethyl isophthalate
9.71 g dimethyl terephthalate
16.92 g ethoxylated 4,4' sulfonyl diphenol
13.02 g ethylene glycol
65.17 mg zinc acetate dihydrate The content of the flask was heated at 210°–218° C. under nitrogen atmosphere for 3 hours and 35 minutes. During this time, methanol was distilled off. Then 56.8 mg of bismuth acetate was added. The reaction temperature was raised to 240° C. After 45 minutes, the nitrogen flow was stopped and the reaction was continued under vacuum of less than 0.5 mm Hg at 265°–275° C. After 4 hours, the reaction was stopped and 46 mg of triphenyl phosphite was added. The inherent viscosity of the copolyester was 0.59, and other properties are shown in Table A.

EXAMPLE 4

Into a 300 ml 3-necked round bottom flask, equipped with a nitrogen gas inlet tube, stirrer and a condenser, the following compounds were added:
29.13 g dimethyl isophthalate
7.61 g bis(4-beta-hydroxyethoxyphenyl) sulfone
21.86 g ethylene glycol
0.18 g titanium tetrabutoxide The content of the flask was heated at 195°–205° C. under nitrogen atmosphere for 4 hours. During this time, methanol was distilled off. Then the reaction temperature was raised to 250° C. After 30 minutes, the nitrogen flow was stopped and the reaction was continued under vacuum of less than 0.5 mm Hg at 250° C. Excess ethylene glycol was continuously distilled off. The inherent viscosity of the copolyester was 0.55, and the other properties were as shown in Table A.

EXAMPLE 5

Into a 300 ml 3-necked round bottom flask, equipped with a nitrogen gas inlet tube, stirrer and a condenser, the following compounds were added:
19.42 g dimethyl isophthalate
16.92 g bis(4-beta-hydroxyethoxyphenyl) sulfone
12.4 g ethylene glycol
0.1702 g titanium tetrabutoxide The content of the flask was heated at 195°–225° C. under nitrogen atmosphere for 3 hours. During this time, methanol was distilled off. Then the reaction temperature was raised to 270° C. After 45 minutes, the nitrogen flow was stopped and the reaction was continued under vacuum of less than 0.5 mm Hg at 255° C. After 5½ hours, the reaction was stopped. The inherent viscosity of the copolyester was 0.56, and the other properties were as shown in Table A.

EXAMPLE 6

The procedure of Example 5 was substantially repeated but with the different ratios of reactants that are shown in Table A. The inherent viscosity of the polymer was 0.56, and the other properties were as indicated in Table A.

EXAMPLE 7

Into a 300 ml 3-necked round bottom flask, equipped with a nitrogen gas inlet tube, sitrrer and a condenser, the following compounds were added:
7.28 g dimethyl isophthalate
16.99 g dimethyl terephthalate
38.06 g ethoxylated 4,4' sulfonyl diphenol
15.50 g ethylene glycol pl 13.72 g zinc acetate
18.22 mg antimony trioxide The content of the flask was heated at 215° C. under nitrogen atmosphere for 2 hours. During this time, methanol was distilled off. The reaction temperature was then raised to 265° C. After 1 hour, the nitrogen flow was stopped and the reaction was continued under vacuum of less than 0.5 mm Hg at 285° C. After 4 hours, the reaction was stopped. The inherent viscosity of the copolyester was 0.46, when measured in the manner before described. The other properties were as shown in Table A. When the polymerization is repeated using the catalyst system of Example 8 (zinc acetate and titanyl acetylacetonate) the high polymer produced has an inherent viscosity of over 0.55.

EXAMPLE 8

Into a 300 ml 3-necked round bottom flask, equipped with a nitrogen gas inlet tube, stirrer and a condenser, the following compounds were added:
 2.91 g dimethyl is ophthalate
 16.51 g dimethyl terephthalate
 16.92 g ethoxylated 4,4' sulfonyl diphenol
 13.02 g ethylene glycol
 65.17 mg zinc acetate dihydrate The content of the flask was heated at 190°–215° C. under nitrogen atmosphere for 3 hours. During this time, methanol was distilled off. Then 0.1526 g titanyl acetyl acetonate was added. The reaction temperature was raised to 275° C. After 1 hour and 25 minutes the nitrogen flow was stopped and the reaction was continued under vacuum of less than 0.5 mm Hg at 275° C. After 2 hours, the reaction was stopped. The inherent viscosity of the copolyester was 0.59, and the other properties were as shown in Table A.

Following the known forming procedures of the prior art, for example U.S. Pat. No. 3,733,309, a clear biaxially oriented blow molded container (i.e., a container having a bottom wall and circumferential sidewall merging with and proceeding upwardly from the bottom wall, the sidewall at its upper margin tapering inwardly and merging with a neck portion defining a mouth opening) is formed from high polymers having the compositions of Examples 1–8. The containers are clear and upon being filled with foodstuffs, medicines, and the like, so as to envelope these substances, show outstanding characteristics for the packaging of such products. The compositions of Examples 1 to 6 are especially outstanding for packaging carbonated beverages.

COMPARATIVE EXAMPLES 9, 10 & 11

The procedure described in Example 1 was generally followed but no dimethyl isophthalate was employed. In Examples 9 & 10 the molar amount of constituent A was solely supplied by dimethyl terephthalate. Additionally in Examples 9 & 10 the percent of bis(4-beta-hydroxyethoxyphenyl) sulfone employed was first about 70% (Example 9) based on the dimethyl terephthalate in accordance with the general teachings of the above-referred to Japanese Showa Publication 50-51595 and in Example 10 the percent of bis(4-beta-hydroxyethoxyphenyl) sulfone was 50% which is the same amount employed in Comparative Example 1 of that Japanese Publication. Table B below summarizes the oxygen permeability, the carbon dioxide permeability, and the glass transition temperatures of those two polyesters. Example 11 also relates to that Japanese Publication by employing 85 mole percent of dimethyl terephthalate as a constituent and, from the list of optional dicarboxylic acids of that Japanese Publication, the dimethyl ester of diphenyl sulfone dicarboxylic acid (DMS) was employed in an amount of 15 mole percent. Table B shows the oxygen and carbon dioxide permeabilities of that polyester and its glass transition temperature. As will be readily apparent from Table B, illustrating the inferior permeability characteristics of the polyesters of Examples 9, 10 & 11, there is no recognition in the Japanese Publication of the present inventive concept.

EXAMPLE 12

Polyethylene terephthalate was prepared as follows:
Into a 500 ml 3-necked round bottom flask, equipped with a nitrogen gas inlet tube, stirrer and a condenser, the following compounds were added:
 46.5 g dimethyl terephthalate
 35.4 g ethylene glycol
 0.0263 g zinc acetate dihydrate
 0.01398 g antimony trioxide The content of the flask was heated at 220° C. under nitrogen atmosphere for 3 hours. During this time, methanol was distilled off. Then the reaction temperature was raised to 280° C., nitrogen flow was stopped and vacuum was gradually applied until less than 0.5 mm Hg. Excess ethylene glycol was continuously distilled off. The reaction was stopped after 4 hours. The inherent viscosity was 0.83, the glass transition temperature was 72° C., the oxygen permeability was 9.3 cc.mil/100 in$^2$.day.atm. and the carbon dioxide permeability was 62 cc.mil/100 in$^2$day.atm.

It will be seen that BSE generally increases the $CO_2$ permeability of either the terephthalate-glycol polyesters when added as a third monmer. According to the present invention, however, BSE added to the isophthalate or the isophthalate-terephthalate polymer reaction mixtures with ethylene glycol produces polymers with appreciably lower permeabilities than PET and yet higher glass transition temperature than that polyester.

TABLE A

| Example | % DMI | % DMT | % BSE | Mole Ratio of EG/BSE | $O_2$ | $CO_2$ | Tg |
|---|---|---|---|---|---|---|---|
| 1 | 100 | 0 | 85 | 70/30 | 4.5 | 21.9 | 112° C. |
| 2 | 60 | 40 | 85 | 70/30 | 5.9 | 38.5 | 117° C. |
| 3 | 50 | 50 | 50 | 81/19 | 5 | 38 | 105° C. |
| 4 | 100 | — | 15 | 94/6 | 2.6 | 14.2 | 78° C. |
| 5 | 100 | — | 50 | 80/20 | 3.5 | 16.9 | 98° C. |
| 6 | 100 | — | 70 | 74/26 | 4.0 | 22.87 | 104° C. |
| 7 | 30 | 70 | 90 | 70/30 | — | 54 | 117° C. |
| 8 | 15 | 85 | 85 | 70/30 | 7.2 | 56 | 121° C. |

TABLE B

| Example | % DMT | % DMS | % BSE | Mole Ratio of EG/BSE | $O_2$ | $CO_2$ | Tg |
|---|---|---|---|---|---|---|---|
| 9 | 100 | — | 70 | 74/26 | 9.0 | 75.0 | 119° C. |
| 10 | 100 | — | 50 | 80/20 | 9.6 | 77.9 | 115° C. |
| 11 | 85 | 15 | 85 | 70/30 | 8.9 | 86 | 124° C. |

As will be evident to those skilled in the art, various modification of this invention can be made or followed in the light of the foregoing disclosure and discussion without departing from the spirit and scope of the disclosure or from the scope of the claims.

I claim:

1. A molded container formed from materials which comprise a linear copolyester consisting essentially of the polymeric reaction product of
 (A) isophthalic acid and, optionally, terephthalic acid, and
 (B) bis(4-beta-hydroxyethoxyphenyl) sulfone and ethylene glycol the amount of said A reactants, in mole percent, being between about 15% to 100% isophthalic acid and 85% to 0% terephthalic acid, the amount of said bis(4-beta-hydroxyethoxyphenyl) sulfone being at least 15 and up to 90 mole percent of the combined amounts of said A reactants and the combined amounts of said B reactants being about 110% to about 300% of the combined amount of said A reactants, said polyester having an $O_2$ and $CO_2$ permeabilities which are, respectively, less than 8 and less than 58 cc.mil/100 in$^2$.day.atm. on an unoriented basis and a glass transition temperature greater than 75° C.

2. The molded container of claim 1 wherein the amount of said bis(4-beta-hydroxyethoxyphenyl) sulfone is between about 80% to about 90% of the amount of said A reactants.

3. The molded container of claim 2 wherein the amount of said bis(4-beta-hydroxyethoxyphenyl) sulfone is about 85% of said A reactants.

4. The molded container of claim 1 wherein the amount of isophthalic acid is between 40 to 100% and the amount of terephthalic acid is between 60 and 0% of said A reactants.

5. The molded container of claim 4 wherein the amount of isophthalic acid is between about 100% to 60% and the amount of terephthalic acid is between 0% to 40% of said A reactants.

6. The molded container of claim 5 wherein the amount of said bis(4-beta-hydroxyethoxyphenyl) sulfone is about 80% to about 90% of said A reactants.

7. The molded container of claim 1 wherein said container which is formed from said polyester is a biaxially oriented container.

8. A molded container formed from materials which comprise a linear copolyester consisting essentially of the polymeric reaction product of
   (A) isophthalic acid and, optionally, terephthalic acid, and
   (B) bis(4-beta-hydroxyethoxyphenyl) sulfone and ethylene glycol the amount of said A reactants, in mole percent, being between about 15% to 100% isophthalic acid and 85% to 0% terephthalic acid, the amount of said bis(4-beta-hydroxyethoxyphenyl) sulfone being at least about 20 mole percent and up to 90 mole percent of the combined amounts of said A reactants and the combined amounts of said B reactants being about 110% to about 300% of the combined amounts of said A reactants, said polyester having an $O_2$ and $CO_2$ permeability less than that of poly(ethylene terephthalate) on an unoriented basis and a glass transition temperature greater than that of poly(ethylene terephthalate).

* * * * *

UNITED STATES PATENT AND TRADEMARK OFFICE
CERTIFICATE OF CORRECTION

PATENT NO. : 4,110,315
DATED : August 29, 1978
INVENTOR(S) : Santos W. Go

It is certified that error appears in the above-identified patent and that said Letters Patent are hereby corrected as shown below:

Col. 8, Table A, Example 6, under the heading $CO_2$, "22.87" should read --- 22.7 ---.

Signed and Sealed this

Eleventh Day of September 1979

[SEAL]

Attest:

LUTRELLE F. PARKER

*Attesting Officer*     *Acting Commissioner of Patents and Trademarks*